United States Patent [19]
Holmes

[11] 3,858,734
[45] Jan. 7, 1975

[54] VEHICLE TOWING DEVICE
[75] Inventor: Gerald E. Holmes, Chattanooga, Tenn.
[73] Assignee: Ernest Holmes Company, Chattanooga, Tenn.
[22] Filed: Jan. 22, 1973
[21] Appl. No.: 325,868

[52] U.S. Cl. .............................. 214/86 A, 280/402
[51] Int. Cl. .............................................. B60p 3/12
[58] Field of Search .......... 214/86 A; 280/480, 492, 280/493, 494, 495, 502, 402

[56] References Cited
UNITED STATES PATENTS
2,933,211  4/1960  Smith .............................. 214/86 A
3,398,976  8/1968  Menzl .......................... 214/86 A X
3,610,447  10/1971  Ortiz ................................ 214/86 A Primary Examiner—Albert J. Makay
Attorney, Agent, or Firm—Lamont Johnston

[57] ABSTRACT

A hitch for quickly and securely lifting and towing one end of a vehicle which includes a transverse tow bar pivotally connected to the truck, longitudinal supporting members connected to the tow bar, hooks sliding relative to the longitudinal members, the hooks and longitudinal members supporting each other, and one or more beams or blocks carried by the longitudinal members and supporting the towed vehicle, the beams or blocks being adjustable longitudinally and transversely on the longitudinal members.

2 Claims, 8 Drawing Figures

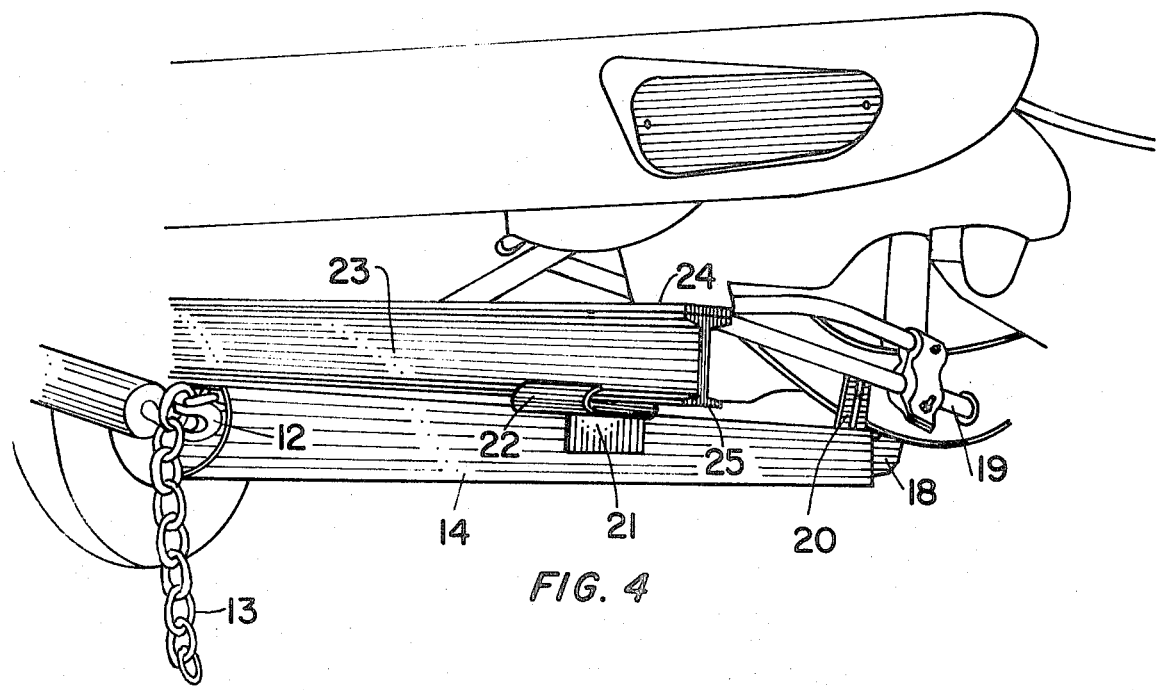
FIG. 4
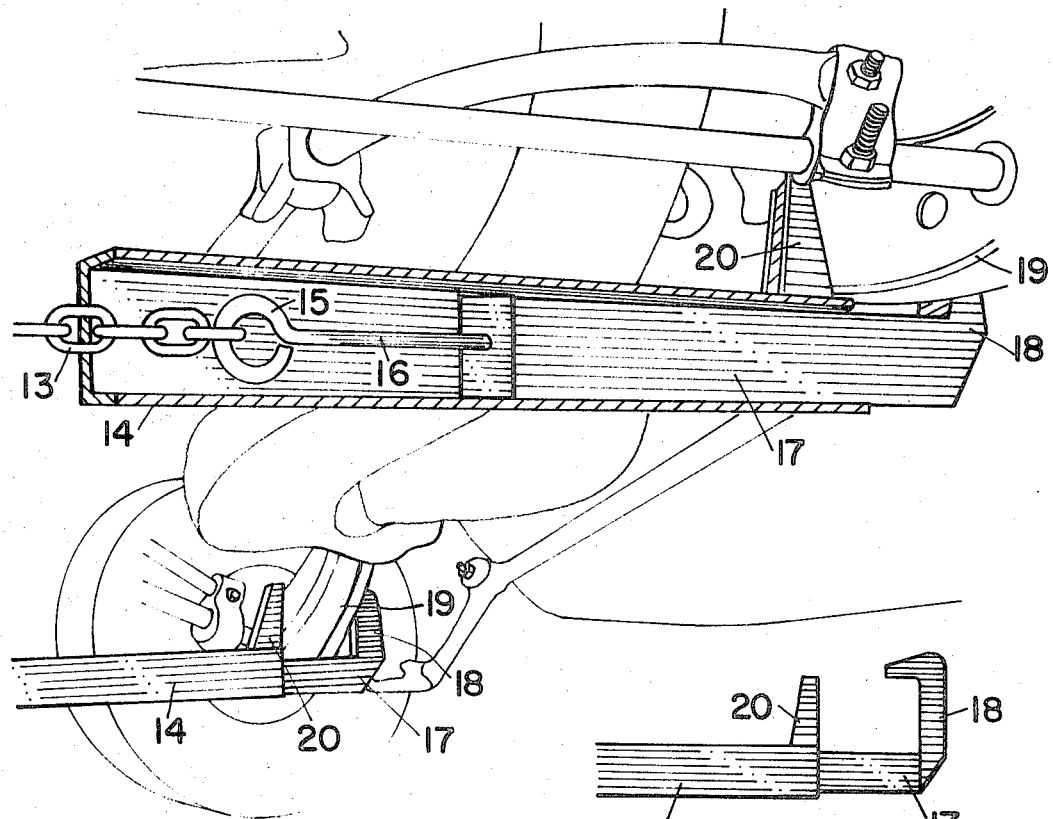
FIG. 5
FIG. 6

VEHICLE TOWING DEVICE

BACKGROUND OF THE INVENTION

Present-day automobiles have fragile bumpers including energy absorption bumpers and exposed body panels, such as valance panels and under-panels, with the result that it is very difficult to lift one end of a car without damaging the bumper or panels. This is true even with use of a lifting and towing sling hitch utilizing one or more fabric straps, as disclosed in my U.S. Pat. No. 2,913,131, issued Nov. 17, 1959.

SUMMARY OF THE INVENTION

The present invention is intended to provide a hitch which can be quickly and securely attached to lift one end of a vehicle and tow it in such a manner as not to damage the vehicle in any way. This is accomplished by making the hitch with longitudinally adjustable hooks for hooking to the supension members of the towed vehicle. The hooks are slidable relative to longitudinal supporting members and coact with spurs projecting from the longitudinal members in such a way that the hooks engage securely suspension members of the towed vehicle. One or more transverse supporting beams or blocks are supported by the longitudinal members in such a way that the beams or blocks can be adjusted both longitudinally and transversely relative to the longitudinal members. The longitudinal supporting members are attached to a tow bar supported on the rear end of a towing vehicle.

An object of the invention is to provide a towing apparatus capable of being quickly applied to a damaged vehicle so as to reduce the time during which the vehicle will block traffic, i.e., which will not require much time in making or releasing the connection with the car to be towed. This towing device will enable a wrecker to pick up a wrecked car in a matter of seconds after the arrival of the wrecker on the scene. It is so simple to operate that an inexperienced person can quickly attach it to a damaged vehicle to elevate one end of the vehicle to a position for towing it.

Another object of the invention is to provide a hitch for lifting and towing one end of a vehicle which comprises a device for supporting the weight of the towed vehicle in such a manner as not to damage it in any way.

A further object of the invention is to provide an automobile towing device for use with wrecking trucks which is adjustable to fit all types and models of automobiles and especially current models having relatively fragile bumpers and valance panels which can be readily damaged in towing.

BRIEF DESCRIPTION OF THE DRAWING

FIG. 4 is another close-up perspective view showing the completed attachment;

FIG. 5 is a detail view, partly in section, showing the completed attachment;

FIG. 6 is a detail view of the hook and spur which coact to grasp and hold securely the under frame of the vehicle;

DESCRIPTION

Figure 1:
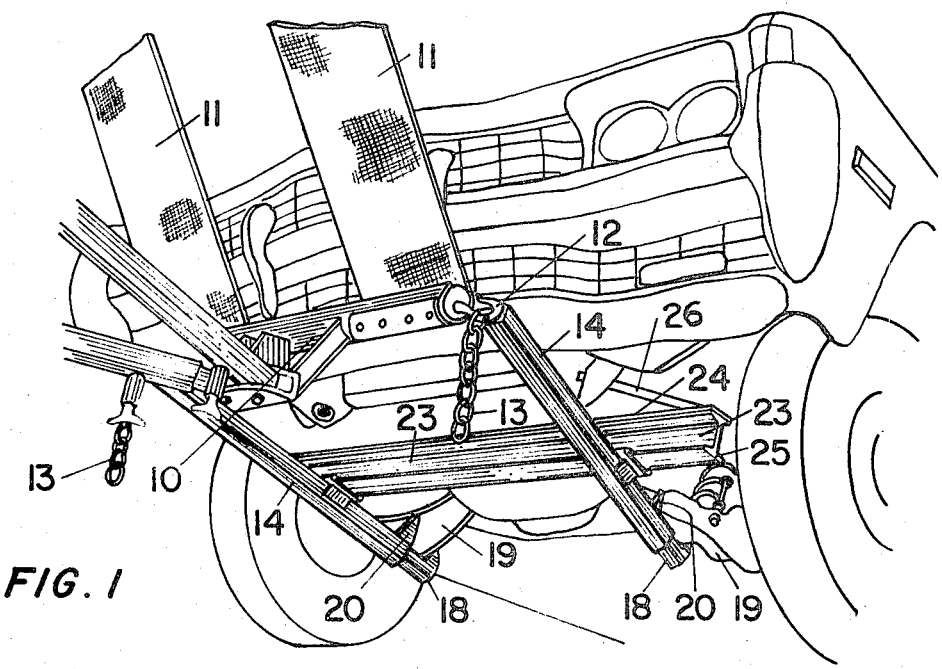
FIG. 1 is a perspective view from below showing one embodiment of the invention.
Figure 2:
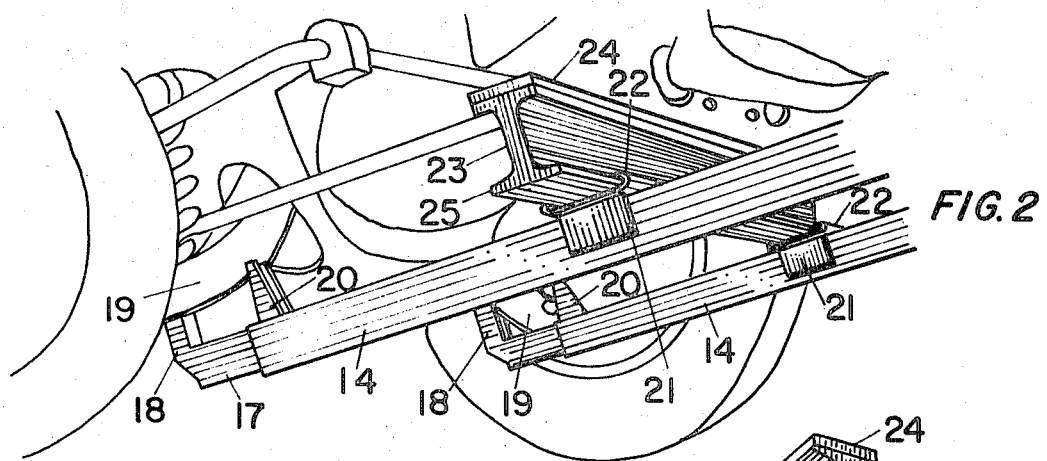
FIG. 2 is a close-up perspective view from below showing the hitch in the process of being hooked to the vehicle.
Figure 3:
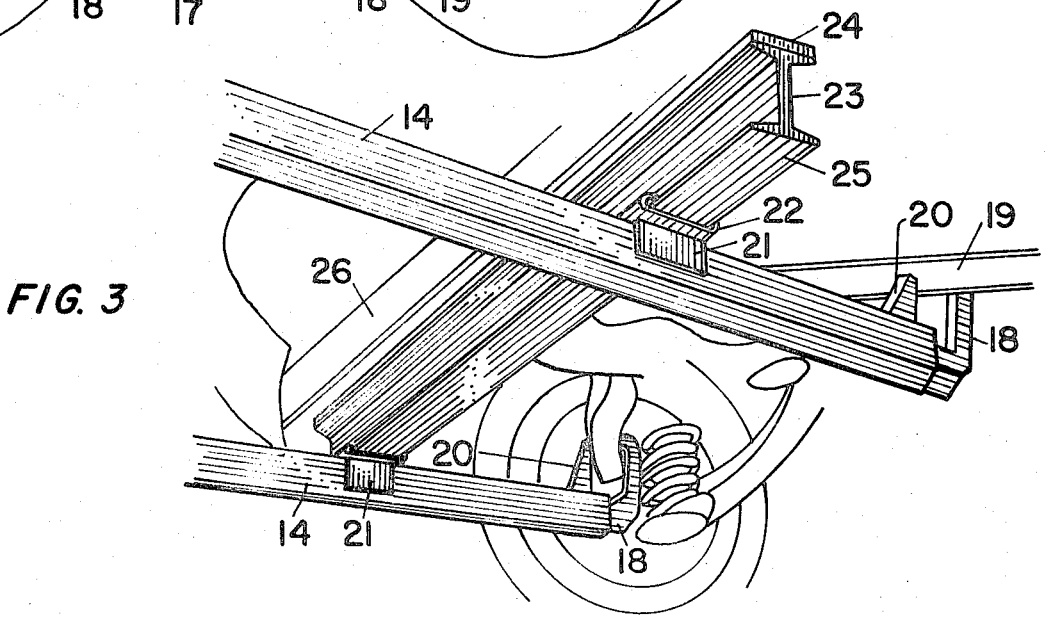
FIG. 3 is another close-up perspective view from below, as in FIG. 2.

A tow bar 10 is pivotally connected to a towing or wrecker truck (not shown) and may be supported by one or more fabric straps 11, in a manner similar to that shown in my prior patent, or it may be any other type of tow bar. Onto a grabhook 12, one at each end of the tow bar, is hooked a chain 13.

In one embodiment of the invention, the chain extends within or alongside a sleeve, tube or other longitudinal supporting member 14 and is attached at its other end to an eye 15 on the end of a rod 16 which is screwed into or otherwise attached to an elongated hook 17. As shown in FIGS. 5 and 6, the hook is slidable relative to and may be telescopically mounted within the sleeve and its outer or hook end 18 is so shaped that it can be readily and quickly hooked over a suspension member 19 of a car or other vehicle to be towed. A spur 20 is attached to the longitudinal member in such a position as to cooperate with the outer end 18 of the hook so as to hold the suspension member 19 of the vehicle securely.

The chain 13 provides a means of attachment of the hook 18 to the grabhook 12 on one end of the tow bar, so that the longitudinal member and the eye, rod and hook 15-18 are securely attached but readily pivot vertically from the tow bar.

To the top of each longitudinal member 14 a support fitting 21 may be slidably attached in such a way that it is comparatively free to slide longitudinally along the top of the member. The fitting has C-shaped sides 22 which are adapted to receive and hold, in such a way that it can slide fairly freely transversely, a beam 23, such as an aluminum I-beam. To the upper surface of the beam is attached, as by vulcanizing, cementing, bolting or riveting, a non-slippery or non-skid surface 24 such as rubber, neoprene or the like to prevent the towed vehicle from sliding on the beam. The C-shaped sides 22 of the fitting engage and hold securely the edges of the lower flange 25 of the I-beam, so that the I-beam is comparatively free to be slid transversely relative to the longitudinal members 14 to such a position that the I-beam will support securely the appropriate lower frame members 26 of the car to be lifted and towed.

Figure 7:
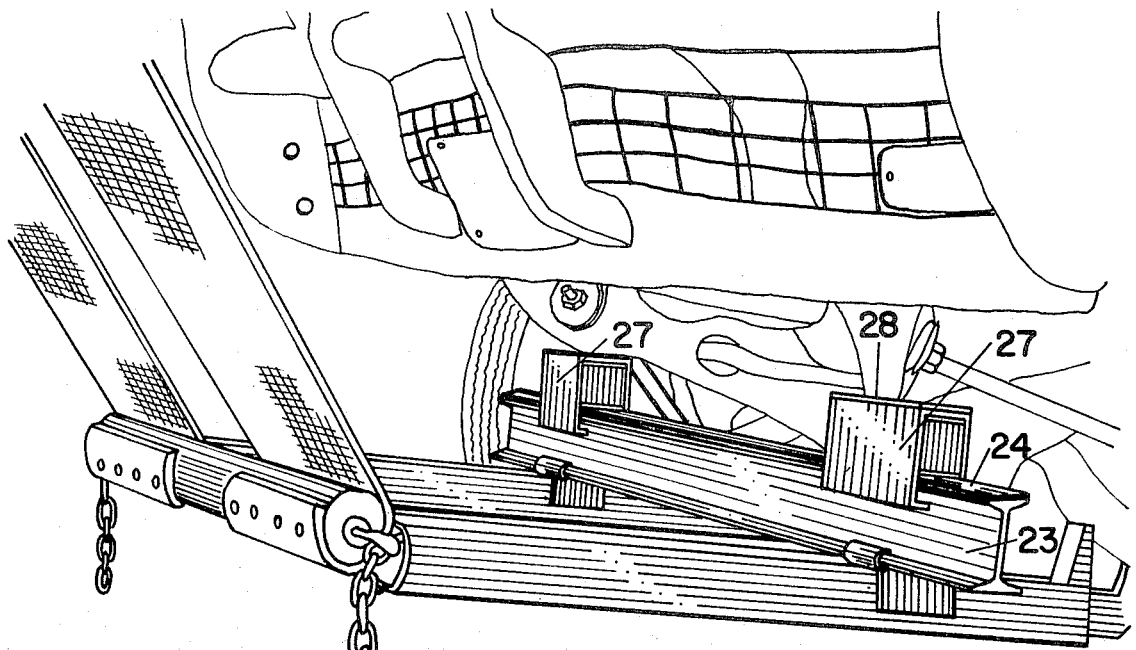
FIG. 7 is a perspective view of a modification in which adapter support blocks are used on top of a transverse I-beam.

A modification is illustrated in FIG. 7 in which adapter support blocks 27 are mounted on top and slidable transversely on the top 24 of the I-beam 23. The upper surfaces 28 of the blocks may be suitably padded. They are capable of transverse adjustment to support all the weight of any car being towed. On some cars, there are radiator tanks and air conditioning systems which extend downwardly in the center of the car and by which a car cannot be supported, so that the support must be on the sides by the frame or some solid part. In such a case, the adapter support blocks would be needed.

Figure 8:
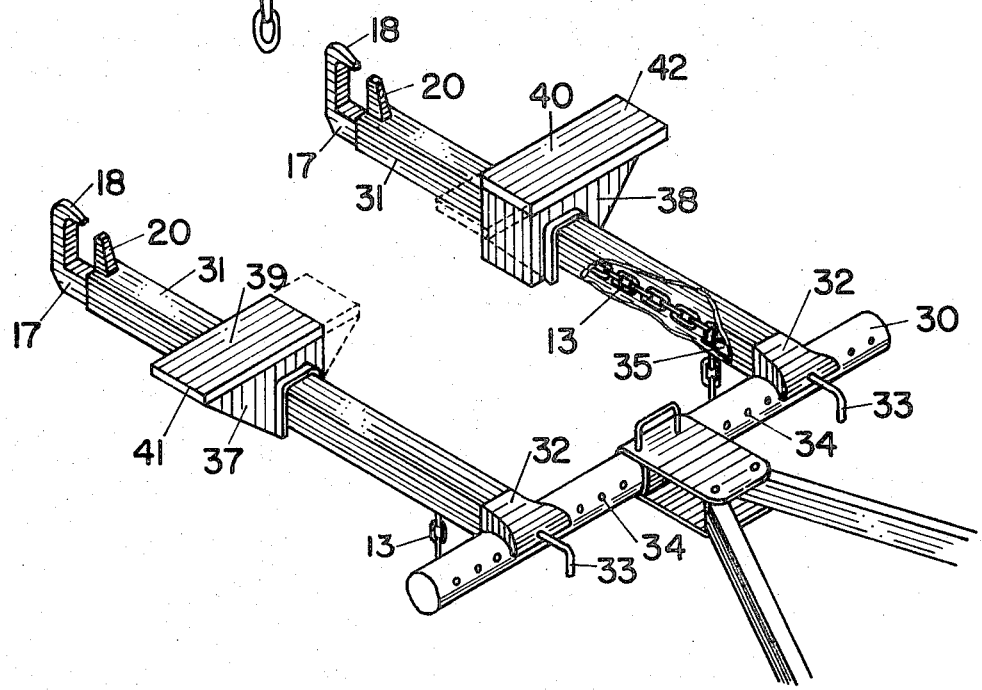
FIG. 8 is a perspective view of another embodiment or modification of the invention, partly in section.

Another embodiment or a modification of the invention is illustrated in FIG. 8. In this embodiment, a tow bar 30 is pivotally attached to the wrecker truck in any suitable manner. Sleeves, tubes or other longitudinal supporting members 31 are connected to the tow bar in any suitable manner, as by means of cuffs 32 attached to the members 31, or some other type of solid connection between the sleeves and the tow bar. The cuffs may be attached, e.g., by pins 33 inserted through the cuffs into holes 34 in the tow bar.

As in the other embodiment, elongated hooks 17 with hook ends 18 are slidable relative to the sleeves 31 and may be held longitudinally, as by means of chains 13 extending from the hooks within the sleeves. One way the hooks and the chains in this embodiment, may be secured to the sleeves is by means of locking slots 35 in the lower surfaces of the sleeves. When the hook ends 18 are in positions to hold towed vehicle suspension members 19 against the spurs 20 on the sleeves, the chains are secured by hooking them in the slots.

In place of the adapters 21 and I-beam 23 in the other embodiments, two support blocks 37 and 38 can be used, these blocks being slidable independently on the longitudinal supporting members 31. These blocks carry ledges or platforms 39 and 40 for supporting frame members 26 and thus the weight of one end of a car. The ledges and/or blocks can be adjusted transversely in any suitable manner so that the outer sides 41 and 42 of the ledges will reach and support adequately the frame members of some cars. Any tendency of such an off-center weight to twist the ledges, blocks and longitudinal members 31 is counteracted and prevented, as by means of the cuffs 32, so that the support will be stable.

By virtue of the quickly attached and firm coaction between the hook ends 18 and the spurs 20, the suspension members 19 of the towed vehicle are quickly and securely attached for lifting and towing one end of the vehicle.

In use of the invention, it has been found by experience that use of the attachment with a towing device provides a safe and secure method of hooking a wrecking truck onto a damaged vehicle, or other vehicle to be removed from a busy highway or street. The attachment can be quickly applied to a vehicle so as to reduce the time during which the vehicle will block traffic. In practice, it has been found that, with an experienced operator, such a vehicle can be hooked on in a time of approximately two minutes after the towing vehicle arrives at the scene and gets into the proper position. This is very important on busy streets and highways. The ability to adjust the position, both transversely and longitudinally, of the beam 23, adapter blocks 27 and 28 or support blocks 37 and 38 makes this possible, as does the design of the chain and hook 14, 15, 16, 17 and 18, coacting with the spur 20 in such a way that the hook can be quickly attached to a suspension member 19, the hook end being quickly drawn into close proximity to the spur 20 on the longitudinal member to grasp the towed vehicle suspension member securely. By having the portion 17 of the hook in adjustable relationship to the sleeve or other longitudinal supporting member, such as a solid bar sliding outside of the sleeve, the hook is attached firmly and supports, through the means of the beam 23, adapter blocks 27 and 28 or support blocks 37 and 38, a vehicle to be towed in a very safe and secure manner.

This towing device is readily adjustable to fit all types and models of automobiles.

Because of its design, this device will not damage a towed car in any way.

It will be apparent to those skilled in the art that various changes may be made in the invention, without departing from the spirit and scope thereof, and therefore the invention is not limited by that which is shown in the drawings and described in the specification, but only as indicated in the appended claims.

I claim:

1. A hitch for lifting and towing one end of a vehicle comprising a transverse tow bar supported by a towing truck; a pair of rigid elongated hooks adapted to hook around suspension members of the vehicle and a pair of spaced rigid longitudinal supporting members of rectangular and tubular shape having a top and sides, said hooks telescoping within said longitudinal members and rigidly supporting each other, the longitudinal members being attached to the transverse bar; the longitudinal members having spurs adjacent one end extending perpendicularly upward to cooperate with the hooks in holding firmly suspension members of the vehicle; and at least one transverse support member attached by a slidable fitting to the sides and top of each longitudinal member whereby the longitudinal members and the transverse support member are relatively adjustable.

2. The hitch according to Claim 1 in which the transverse support member includes two support blocks which are slidable independently on the transverse support member.

* * * * *